(12) United States Patent
Faeth et al.

(10) Patent No.: US 10,215,650 B2
(45) Date of Patent: Feb. 26, 2019

(54) MEASURING INSTRUMENT WITH SPREAD MEASURED VALUE OUTPUT

(71) Applicant: WIKA Alexander Wiegand SE & Co. KG, Klingenberg (DE)

(72) Inventors: Michael Faeth, Dammbach (DE); Alexander Hein, Grosswallstadt (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 303 days.

(21) Appl. No.: 15/193,619

(22) Filed: Jun. 27, 2016

(65) Prior Publication Data

US 2016/0377459 A1 Dec. 29, 2016

(30) Foreign Application Priority Data

Jun. 25, 2015 (DE) .................. 10 2015 008 098

(51) Int. Cl.
*G01L 7/04* (2006.01)
*G01D 5/04* (2006.01)
*G01D 7/00* (2006.01)

(52) U.S. Cl.
CPC .............. *G01L 7/04* (2013.01); *G01D 5/04* (2013.01); *G01D 7/00* (2013.01)

(58) Field of Classification Search
CPC ... G01D 5/04; G01D 7/02; G01D 7/08; G01L 7/04; G01L 19/08; G01L 19/083; G01L 19/086; G01L 19/10; G01L 19/12; G01L 19/18

USPC ........................................................ 116/292
See application file for complete search history.

(56) References Cited

U.S. PATENT DOCUMENTS

| | | | | |
|---|---|---|---|---|
| 2,720,787 A * | 10/1955 | Dickie | .................... | G01L 7/041 73/711 |
| 3,992,945 A * | 11/1976 | Judson | .................. | G01L 9/0027 338/40 |
| 4,748,404 A * | 5/1988 | Heinze et al. | ......... | G01R 13/02 324/114 |
| 5,969,224 A * | 10/1999 | Ebara et al. | .............. | G01P 1/08 116/62.1 |
| 8,299,938 B2 * | 10/2012 | Hedtke | .................... | G01D 7/02 340/870.02 |
| 9,151,642 B2 * | 10/2015 | Ohno et al. | ........... | G01D 13/20 |
| 2013/0118279 A1 * | 5/2013 | Ohno et al. | ............ | G01D 7/002 73/866.3 |

FOREIGN PATENT DOCUMENTS

| | | | | |
|---|---|---|---|---|
| EP | 608852 A1 * | 8/1994 | ........... | H02B 13/065 |
| FR | 934385 A * | 5/1948 | ............... | G01D 5/04 |
| GB | 652259 A * | 4/1951 | ............... | G01D 5/04 |

* cited by examiner

*Primary Examiner* — Richard A. Smith
(74) *Attorney, Agent, or Firm* — Muncy, Geissler, Olds & Lowe, P.C.

(57) ABSTRACT

A measuring system is provided in which the evaluation of a measuring signal is resolved in a variably spread manner or is output in a variably scaled manner on a dial as a function of the measured value range.

10 Claims, 5 Drawing Sheets

US 10,215,650 B2

MEASURING INSTRUMENT WITH SPREAD MEASURED VALUE OUTPUT

This nonprovisional application claims priority under 35 U.S.C. § 119(a) to German Patent Application No. 10 2015 008 098.9, which was filed in Germany on Jun. 25, 2015, and which is herein incorporated by reference.

BACKGROUND OF THE INVENTION

Field of the Invention

The present invention relates to a measuring system and a measuring instrument for measuring a physical quantity or a change in a physical quantity, in which the evaluation of a measuring signal is resolved in a spread manner or output on a dial in a variably scaled manner, depending on the measured value range traversed.

Description of the Background Art

In electrical switchgear, in particular, it is common practice to monitor the pressure or the density of an insulating gas. For example, SF6, sulfur hexafluoride, is a gas of this type for "gas-insulated switchgear" (GIS) of this type.

This gas is used as an insulating gas in electrical high-voltage switchgear for the purpose of facilitating higher performances than when using ambient air, since the insulation resistance of ambient air is limited at high voltages, which means that much greater distances must be maintained.

For this purpose, SF6 is held, for example, under a pressure of 1.2 to 2 bar. Certain machines are held between 0.4 and 0.6 or 0.8 MPa at a temperature of 20° C.

Depending on the temperature, this value is to be differently controlled due to the volume expansion of the gas, for which reason it has also been established to monitor the pressure in a temperature-compensated manner and thereby to obtain a signal proportionate to the density.

The pressure or the gas density is usually monitored in a gas-insulated switchgear for the purpose of monitoring the operation within a certain pressure or density range. For this purpose, it is advantageous to set one or multiple control points or switches in such a way that a warning or an alarm is output upon undershooting. At the same time, another control point or switch is set in such a way that an impermissible overpressure is also reported. However, since the working range, in particular the optimum pressure range for a switchgear, is very narrow, it is often difficult, in particular in conventional manometers, to reliably and precisely position multiple switches close together.

SUMMARY OF THE INVENTION

It is therefore an object of the invention to provide a cost-effective approach to more accurate representation of a measured value for a particular measuring range in a measuring system. A setup is also to be created, which facilitates control points in this higher-resolution measured value range.

According to an exemplary embodiment of the invention, a measuring system is provided for measuring a physical quantity or a change in the physical quantity, for example, pressure, density, temperature or fill level, including a sensor section, an evaluation unit and a display unit. The sensor section is configured to convert the physical quantity or a change in the physical quantity into a measured variable, and the evaluation unit is configured to convert the measured variable into a measured value. The evaluation unit can output the physical quantity or the change in the physical quantity in predetermined measuring ranges as a measured value in a variably scaled manner.

For this purpose, the evaluation unit may include a gearing or movement having a predetermined function for outputting the physical quantity or the change in the physical quantity in predetermined measuring ranges as the measured value in a variably scaled manner.

According to an embodiment of the invention, the physical quantity or the change in the physical quantity may be output, variably scaled, in predetermined measuring ranges, by means of a mechanical movement, on a dial, in particular with the aid of a pointer; by means of an electronic display; or by means of an electrical measuring line in an analog or digital manner.

According to an embodiment of the invention, the physical quantity or the change in the physical quantity may be output, variable scaled, in predetermined measuring ranges, by means of a mechanical movement on a dial, using a gearing which has at least two different gear ratios, in particular with the aid of a pointer.

According to an embodiment of the invention, the dial can include at least two dial areas assigned to different measuring ranges for displaying the measured value, the dial areas having variable scale spreads, in particular a first dial area having a high scale spread and a second dial area having a low scale spread.

According to an embodiment of the invention, at least one control point can be variably predefinable or programmable in the measuring range having the high scale spread.

According to an embodiment of the invention, the sensor section can be in engagement with a gearing, which has at least two driving toothings, which interact with a driven toothing acting upon a pointer shaft, the driving toothings and/or the driven toothings being provided with at least two different operating diameters.

According to an embodiment of the invention, the sensor section can be in engagement with a gearing which includes a driving toothing that interacts with a driven toothing acting upon a pointer shaft, the driven toothing and/or the driving toothing being provided with an operative diameter that is variable continuously or in steps as a function of the measuring range.

According to an embodiment of the invention, the sensor section can include a Bourdon tube, which is in engagement with the driving toothing or the driving toothings, so that a displacement of the Bourdon tube induces an actuation of the driving toothing or driving toothings.

According to an embodiment of the invention, the measuring system can be provided for measuring pressure, a scale spread being provided in the range of 4 to 7 bar, preferably in the range of 5 to 6 bar, which is higher than a scale spread outside this range.

According to an embodiment of the invention, a device for the temperature-compensated measurement of pressure is provided for determining the density of SF6 or another insulating gas for electrical switchgear. The temperature compensation of the signal can take place before the spread or the variable translation of the signal.

According to an embodiment of the invention, the system can include an evaluation unit, which provides the measuring signals in a higher resolution in predetermined measuring ranges. For this purpose, a higher scale spread is provided in the measuring range which is to be provided with the higher resolution.

At the same time, variable control points can be made available in the range of higher resolution, with the aid of which alarm indications or other switching operations may be triggered in the event of overshooting or undershooting.

As noted above, since the working range, in particular the optimum pressure range for a switchgear, is very narrow, it is often difficult, in particular in conventional nanometers, to reliably and precisely position multiple switches close together. Thus, according to an embodiment of the invention, it is proposed to cover the relevant scale range, which relates to the optimum working range as well as the range of the threshold values, with a measuring instrument in such a way that an improved scale range having an extended or more widely spread resolution is provided for this range.

An approach of this type is also useful for foodstuff and semi-luxury foodstuff processes as well as for all processes having sensitive pressure ranges, in particular a large pressure range which must be precisely set and maintained.

As the approach, it is proposed, for example, to provide a Bourdon manometer with a movement which works with two different gear ratios. In a Bourdon manometer, a measuring tube or Bourdon tube usually drives a toothed wheel segment via a link as the driving toothing, which is in engagement with the toothed shaft of a rotatable pointer as the driven toothing, which then, upon a change in pressure, mechanically translates the latter and displays it on a dial.

If the toothed segment of the driving toothing now receives, in a free space or in a continuation, another toothed segment which includes a toothing on another operative diameter or operative radius, and if it is disposed, offset by the other segment, in such a way that it may engage with a second, corresponding toothing, namely the driven toothing of the pointer shaft, it is possible that, upon the displacement of the Bourdon tube, the one toothing is first in engagement with a first gear ratio and, upon further increase in pressure, the first toothed segment disengages and virtually transfers the operative connection to the pointer on a second toothing, which then comes into engagement and from this point forward drives the pointer shaft as the pressure continues to increase.

The transition from one toothing to the other must, of course, be taken into account. It is advantageous if no jerking, engagement pause or locking or jamming occurs. For the purpose of the smooth transition to another toothing, it may therefore be provided that the toothed segments are positionable with respect to each other, and/or the at least one toothed wheel i.e., one toothing, on the pointer shaft is rotated with respect to the other toothing and is correspondingly fixable for smooth travel after configuration. This is possible by means of screw clamping, adhesive or other measures.

Similarly, it is also conceivable that a scale spread may be implemented with the aid of other gearings or toothings. It is possible, for example, to allow a tooth segment on a bevel wheel to run with a limiting of the two rotation axes. In this way, the scale would spread continuously.

Depending on the gear ratios, gearing or toothing, a logarithmic spread of a scale is also possible, so that the resolution is very high, especially at the end of the scale. Due to different tooth segments, however, different scalings or spreads may also be arranged in series. A graduation is also possible, or only a separate middle range of a scale having an improved resolution.

In each case, a mechanical scale spread also makes it possible to better dispose mechanical switches or control points. Switches of this type are, for example, reed switches, inductive sensors, microswitches or magnetic spring contacts, which are activated by a pointer extension or a magnet on the pointer. It is also conceivable that a control point is sensed by the pointer axis with the aid of a magnet, using Hall, GMR or AMR sensors, a position having been previously defined or stored.

It is similarly also possible to implement the invention on the basis of a semi-electronic or fully electronic product. Thus, the pressure may also be sensed with the aid of a piezoelectric, thin-film or ceramic or capacitive pressure measuring cells, and the measured value/signal conversion may be implemented in an electronic circuit. For this purpose, a scale spread for a range may be stored in a microprocessor or ASIC and electronically output accordingly in 4 to 20 mA format with the aid of an analog signal or as a HART signal. Likewise, a separate display for a normal pressure sensor having a spread scale or indication or improved transfer may be configured for a special measuring range.

The display, namely, for example, an LCD/TFT/elnk or dot matrix display, may then also include graphical elements which have a display or pointer function in connection with a scale. It is even possible that the range of the spread scale may also be defined or changed by the user at a later time.

Likewise, control points for alarming may be freely modified and configured, and status lamps may also be configured, or background colors for setpoint ranges (green) or limit ranges (red) may be provided.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
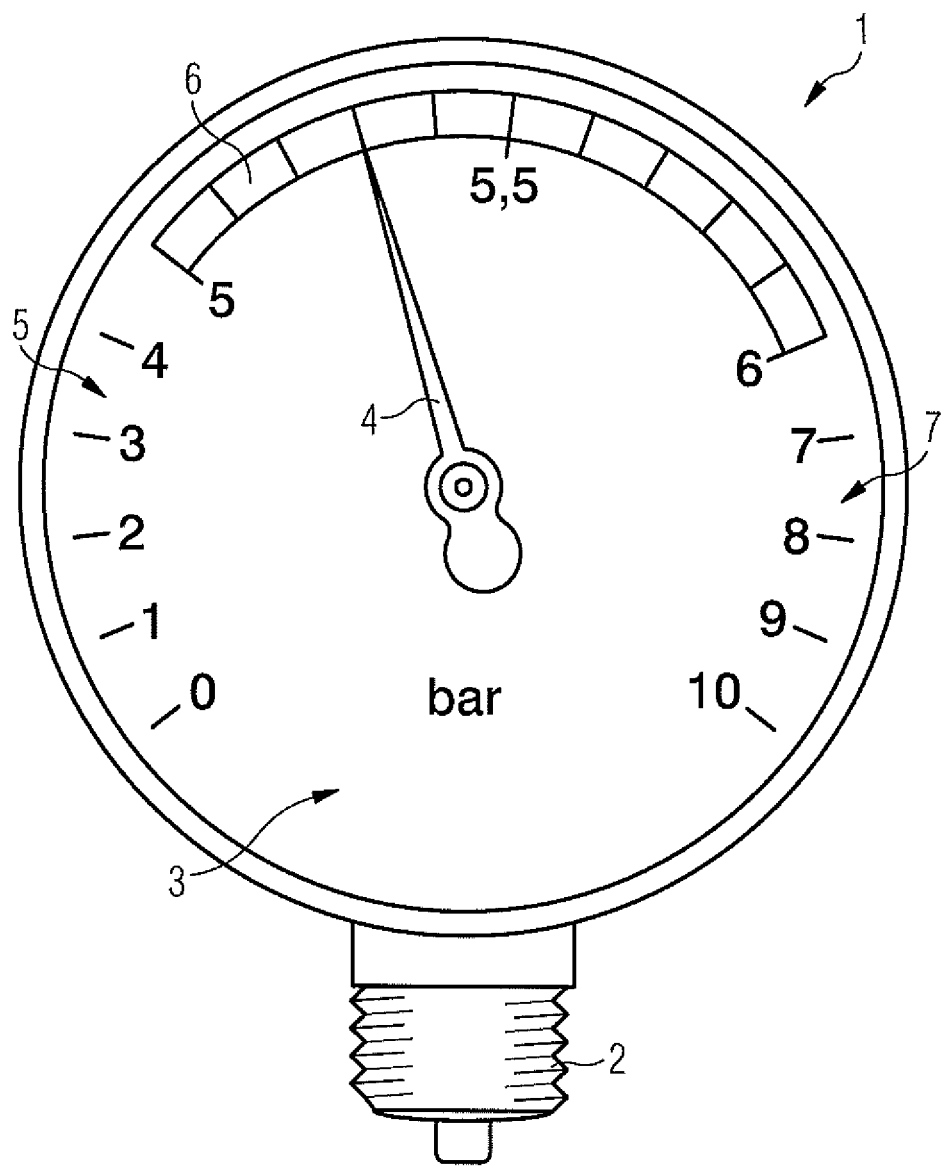
FIG. 1 shows one exemplary embodiment of a pressure measuring instrument having different scale spreads in predetermined measuring ranges.

FIG. 1 shows a pressure measuring instrument 1, which includes a pressure fitting 2 and a dial plate 3 as a dial, over which a pointer 4 may rotate. A first scale section 5 is printed thereon, which extends, for example, from 1 to 5 bar, and a second scale section 6, which has a spread scale, extends, for example, from 5 to 6 bar, which permits a better reading of the measured values in this range. A third scale section 7 is shown adjacent thereto, which represents the pressure, for example from 6 to 10 bar, again with the same resolution as in first scale section 5.

Figure 2:
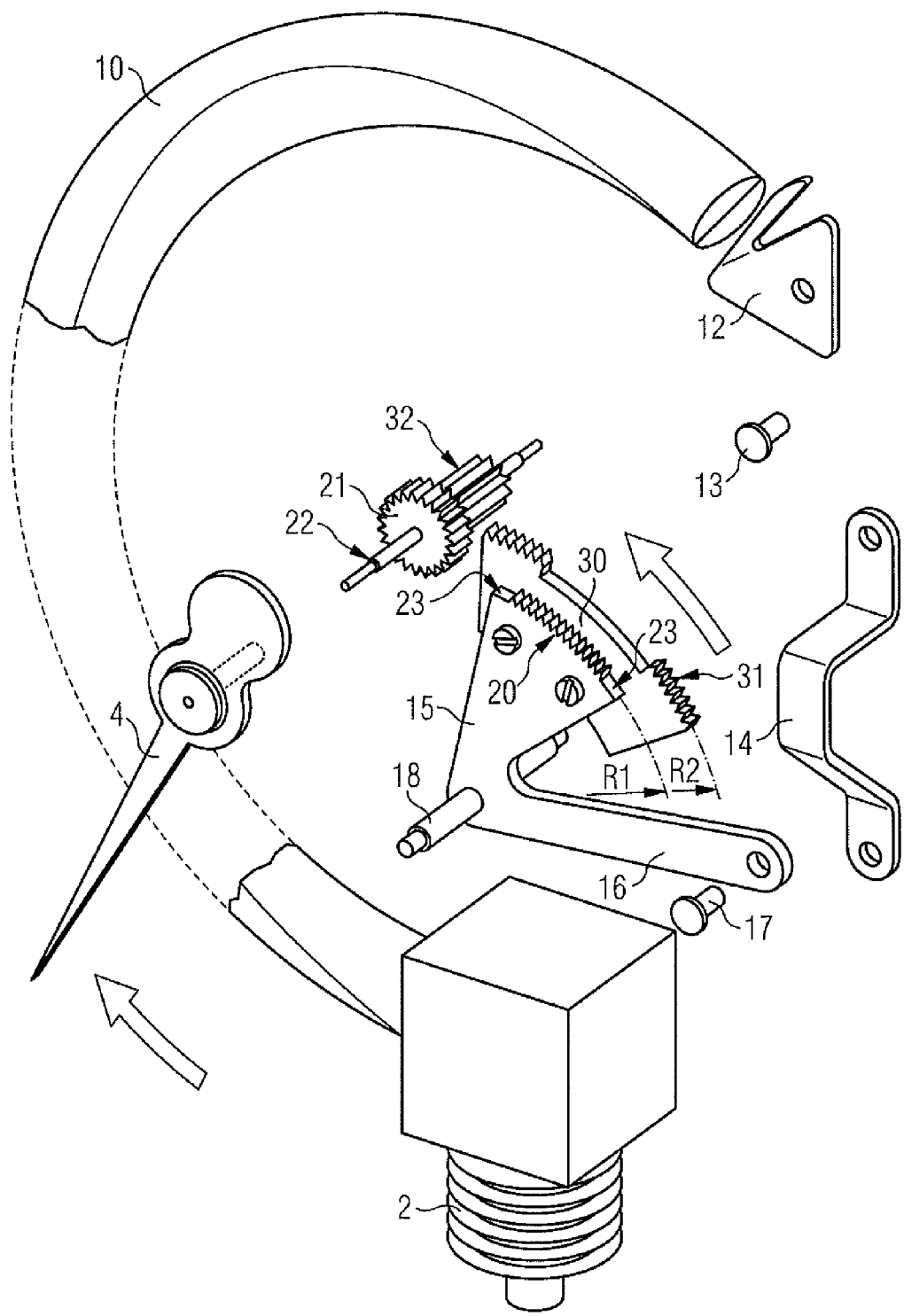
FIG. 2 shows an inner layout of the pressure measuring instrument of one exemplary embodiment in an exploded view.

For this purpose, FIG. 2 shows the inner layout thereof in an exploded view. A Bourdon tube 10, which is tightly connected, preferably welded, to pressure fitting 2, is bent in the shape of a "C" and has an end piece 12 attached to its free end 11. Upon the application of pressure, the C-shaped tube stretches and moves a link 14 upward via a rivet-shaped rotary joint 13. A first toothed segment 15 is furthermore moved around an axis 18, in a rotating pivot motion with the aid of lever arm 16 and a rivet-shaped rotary joint 17, the axis being permanently supported in a rotatably fixed manner in a carrier part, which is not illustrated, in the housing with respect to measuring instrument 1

First toothed segment 15 has a, for example molded-on, toothing 20, which is in engagement with a toothed wheel 21 on a pointer shaft 22. Due to the rotating engagement of toothed segment 15 when the pressure increases, pointer shaft 22 rotates in the clockwise direction, and pointer 4 also moves in the clockwise direction over a dial, which is not illustrated here, or over a first dial region.

Upon further rotation, the toothing moves clear of segment end 23. At the same time, however, a second toothed segment 30 engages with a second toothed wheel 32 on pointer shaft 22 via its toothing 31.

Due to the fact that the toothing of first toothed segment 15 lies on a radius R1 and the toothing of second toothed segment 30 lies on a radius R2, which is bigger than radius R1, the pointer is driven with different gear ratios, depending on which segment of the driving toothing is in engagement with the driven toothing, and different scale resolutions or scale spreads result for the measured values, which may be shown accordingly on the dial of dial plate 3.

Furthermore, link component 14 may be made of a bimetal, which changes its length or the spacing of its link points/bores under the influence of temperature. In this manner, a temperature behavior of the gas (expansion) may be compensated for with regard to the measured value. Due to this compensation, one may furthermore also speak of a representation of density with regard to the scale deflection.

The displacement of the measuring element or the measuring tube is preferably temperature-compensated BEFORE the change in the gear ratio, for example in the form of a bimetal integrated into the mechanism. However, other approaches are also possible, such as a bellows element filled with wax, which changes its length or geometry under the influence of temperature.

Figure 3:
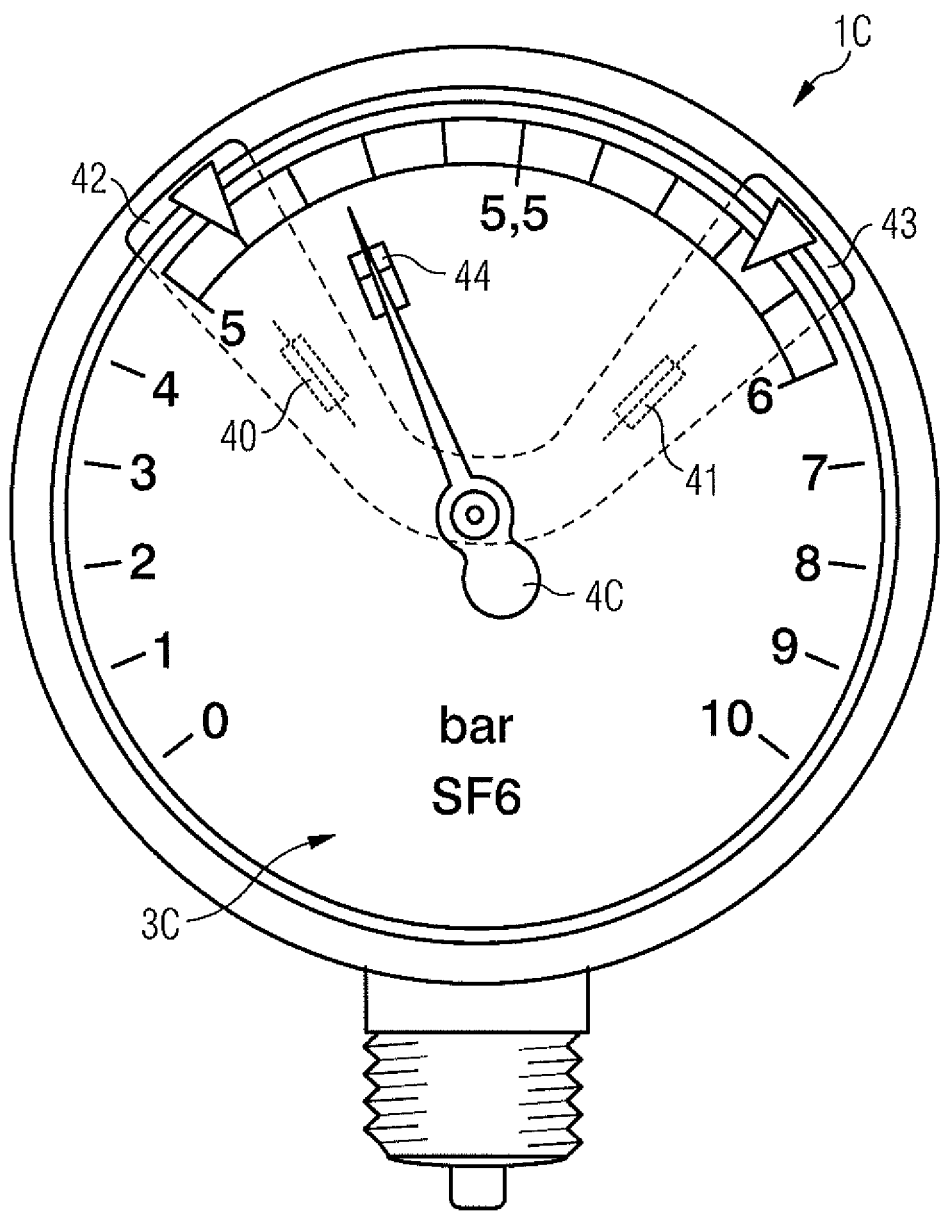
FIG. 3 shows another exemplary embodiment of the pressure measuring instrument.

FIG. 3 shows another embodiment 1C, wherein reed switches 40, 41 are mounted on rotatable and fixable parts 42, 43 behind dial 3C. Due to a magnet 44, which is mounted on pointer 4C, switching functions may be implemented in the event of corresponding pressures/pointer movements. However, magnetic spring contacts may also be addressed directly by a pointer.

At this point, reference is hereby made to alternative switch designs of the WIKA "switchGAUGE" series or products of the WIKA GDM 100-X or GDM 233.X series.

Figure 4:
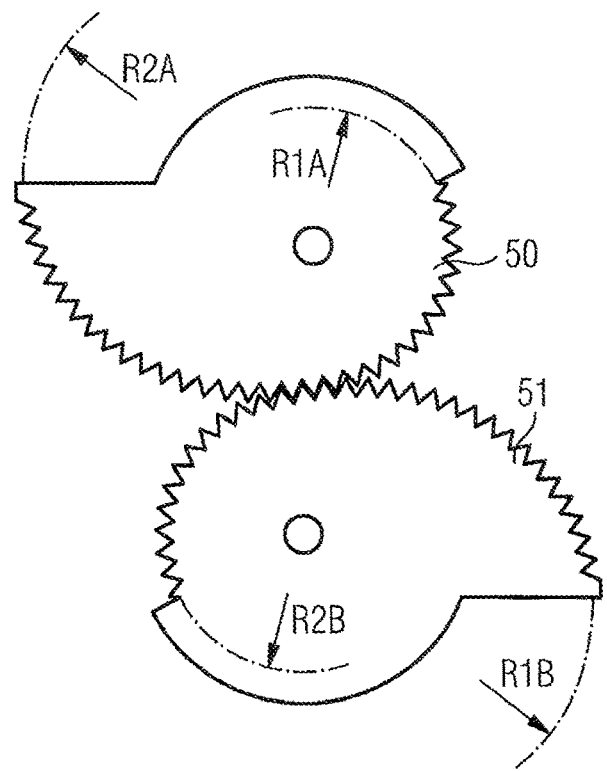
FIG. 4 shows one specific embodiment of a gearing, which may be used in the measuring system according to the invention.

FIG. 4 shows another specific embodiment, including a gearing that is in continuous engagement during gear changes in a transition range between the two gear operative radii (R1A/R1B and R2A/R2B of the two toothed wheels 50 and 51.

In this embodiment, however, it is apparent and conceivable that fluid or logarithmic gear ratios are also possible.

As is apparent here, the toothing is in engagement in a transition range, in which the gear ratio changes by changing the operative radii. It is thus conceivable that this change is carried on continuously, and the scale therefore keeps spreading wider until the end.

As a result of this consideration and invention, it is now also conceivable that a nonlinear behavior of a measuring element or a diaphragm may be linearized by a corresponding gear ratio.

Figure 5:
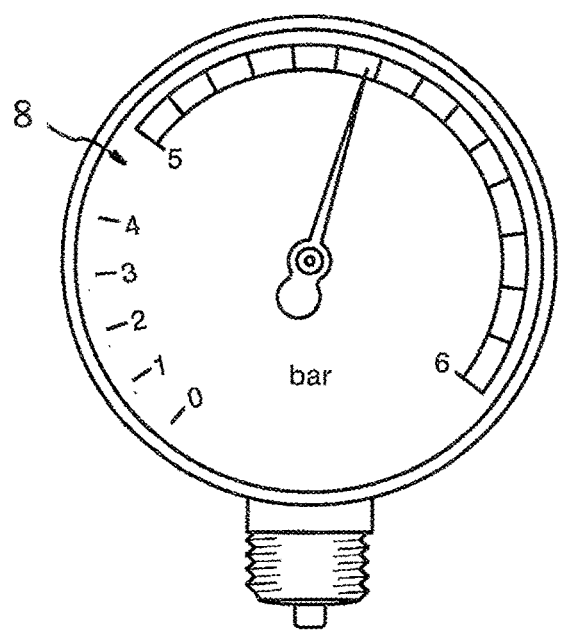
FIG. 5 shows an exemplary embodiment of a pressure measuring instrument having different scale spreads, in particular a higher scale spread in a predetermined measuring range.

FIG. 5 shows the scale corresponding to FIG. 4, which spreads nonlinearly, for example, in a transition range 8 between 4 and 5 bar, because a transition of the toothing already changes or widens the scale resolution here, as shown in FIG. 4, a linear representation having a constant, linear transfer/scaling factor in a spread or expanded resolution is again implemented between 5 and 6 bar, compared to the lower pressure range.

Figure 6:
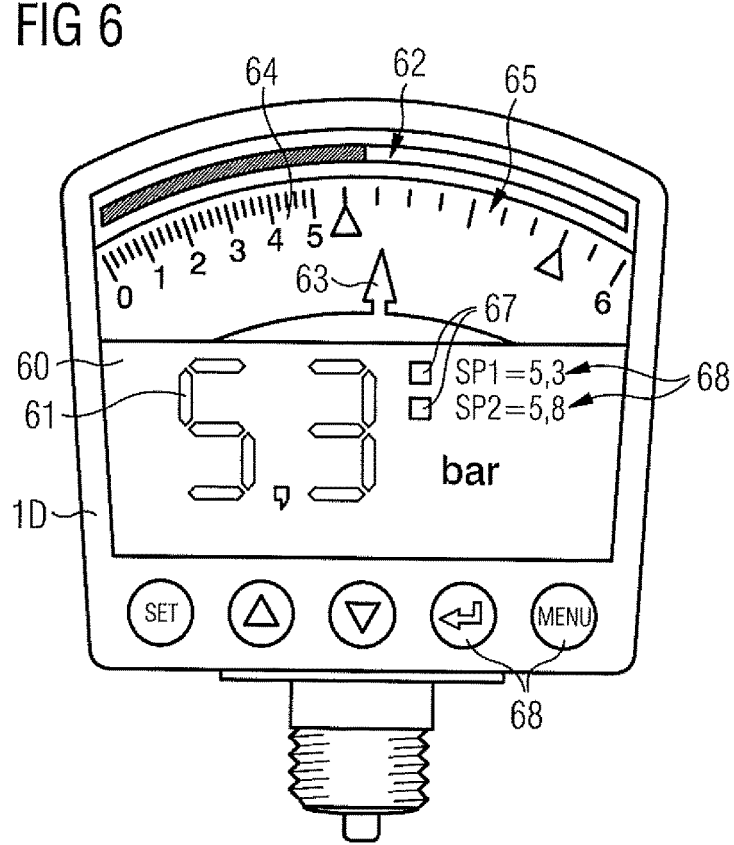
FIG. 6 shows an exemplary embodiment of an electronically implemented measuring system.

FIG. 6 shows an embodiment 1D in electronic form, including electronic display 60. An embodiment of this type is conceivable for both temperature and fill level or any other measured variable. A numeric display 61 is combined with an electronic bar indicator 62 and/or an electronic pointer 62.

Scale 64 and measured value ranges for spread scale 65 (between 5 and 6 bar in this case), control points SP1 and SP2 for pressure threshold values 66, illuminated panels 67 and color background may be assigned pressures, in that the instrument is configured with the aid of a key menu guidance 68 or via an additional device/cable.

Figure 7:
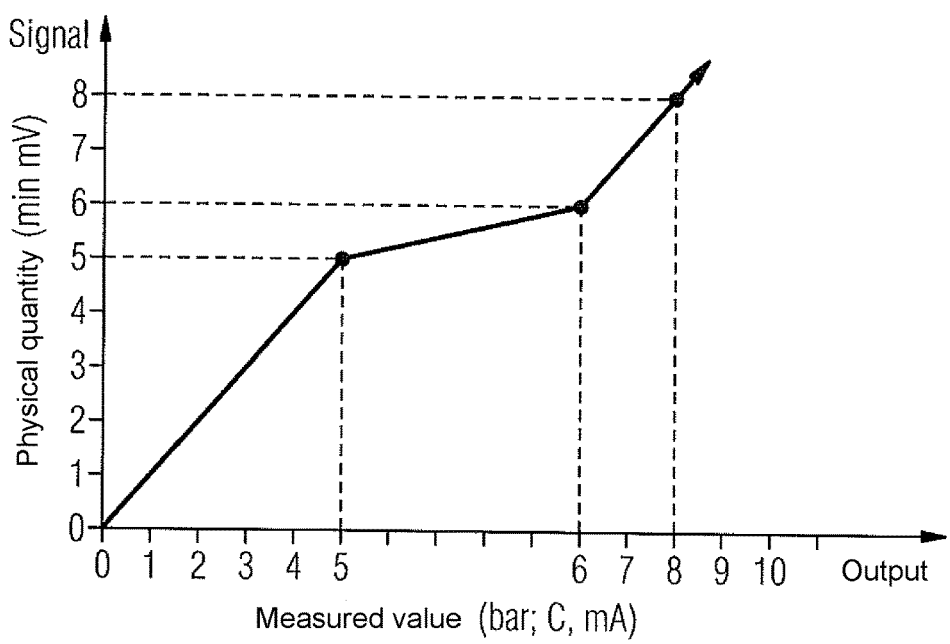
FIG. 7 shows a diagram for explaining different scale spreads.

FIG. 7 shows a stored function of an instrument of this type from FIG. 6 for the purpose of achieving the scale spread with regard to an incoming signal value of a sensor, for example between 5 and 6 bar. This function may be stored in a memory and be used by a CPU to generate the display.

At the same time, it is also conceivable, in connection with FIG. 6, that the pointer in this figure is stationary, and the dial behind the pointer rotates animatedly. In the further, upward course of pressure, a counter-clockwise rotation on a matrix, TFT or elnk display may take place into the viewing section and expose a view of the upper scale of 6 to 8 bar, which is then once again not shown in a spread manner.

It is furthermore possible that, by activating certain release mechanisms, a QR code may be displayed on the display, which leads to a help animation when using a smart phone; it is also conceivable that, upon reaching certain limiting values, application-specific animations, image sequences, warning or instruction sequences, which were previously stored in the device, are displayed and prompt the user to take certain actions. These may also be reminders at recalibration intervals, which appear in a time-controlled manner on the display and which draw attention to themselves in advance with the aid of a symbol and which may be accessed from the menu.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring system for measuring a physical quantity or a change in the physical quantity, the system comprising:

a sensor section configured to convert the physical quantity or a change in the physical quantity into a measured variable;

an evaluation unit configured to convert the measured variable into a measured value, the evaluation unit outputting the physical quantity or the change in the physical quantity in predetermined measuring ranges as a measured value in a variably scaled manner that includes different scaling factors; and a display unit, wherein the physical quantity or the change in the physical quantity is output, variably scaled, in predetermined measuring ranges, on a dial via a mechanical movement using a gearing having at least two different gear ratios and with the aid of a pointer.

2. The measuring system according to claim 1, wherein the physical quantity or the change in the physical quantity is output, variably scaled, as a measured value in predetermined measuring ranges via a mechanical movement on a dial with the aid of a pointer; via an electronic display; or via an electrical measuring line in an analog or digital manner.

3. The measuring system according to claim 1, wherein the dial includes at least two dial areas assigned to different measuring ranges having variable scale spreads, the at least two dial areas including a first dial area having a high scale spread and a second dial area having a low scale spread.

4. The measuring system according to claim 3, wherein at least one control point is variably predefinable or programmable in the measuring range having the high scale spread.

5. The measuring system according to claim 1, wherein the measuring system is provided for measuring pressure, a scale spread being provided in the range of 4 to 7 bar or in the range of 5 to 6 bar, which is higher than a scale spread outside this range.

6. The measuring system according to claim 1, wherein a device for the temperature-compensated measurement of pressure is provided for determining a density of SF6 or another insulating gas for electrical switchgear.

7. The measuring system according to claim 1, wherein the physical quantity or the change in the physical quantity includes pressure, density, temperature or fill level.

8. A measuring system for measuring a physical quantity or a change in the physical quantity, the system comprising:

a sensor section configured to convert the physical quantity or a change in the physical quantity into a measured variable;

an evaluation unit configured to convert the measured variable into a measured value, the evaluation unit outputting the physical quantity or the change in the physical quantity in predetermined measuring ranges as a measured value in a variably scaled manner; and a display unit, wherein the sensor section is in engagement with a gearing, which has at least two driving toothings that interact with at least two driven toothings acting upon a pointer shaft, the driving toothings and/or the driven toothings being provided with at least two different operative diameters.

9. The measuring system according to claim 8, wherein the sensor section includes a Bourdon tube, which is in engagement with the driving toothings so that a displacement of the Bourdon tube induces an actuation of the driven toothings.

10. A measuring system for measuring a physical quantity or a change in the physical quantity, the system comprising:

a sensor section configured to convert the physical quantity or a change in the physical quantity into a measured variable;

an evaluation unit configured to convert the measured variable into a measured value, the evaluation unit outputting the physical quantity or the change in the physical quantity in predetermined measuring ranges as a measured value in a variably scaled manner; and a display unit, wherein the sensor section is in engagement with a gearing that includes a driving toothing that interacts with a driven toothing acting upon a pointer shaft, the driven toothing and/or the driving toothing being provided with an operative diameter that is variable continuously or in steps as a function of the measuring range.

* * * * *